(12) United States Patent
Srinivas et al.

(10) Patent No.: US 7,299,306 B2
(45) Date of Patent: Nov. 20, 2007

(54) DUAL NUMERICALLY CONTROLLED DELAY LOGIC FOR DQS GATING

(75) Inventors: K. Naresh Chandra Srinivas, Bangalore (IN); Anand Pande, Karnataka (IN); Ramanujan K. Valmiki, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 36 days.

(21) Appl. No.: 10/600,247

(22) Filed: Jun. 20, 2003

(65) Prior Publication Data

US 2004/0260865 A1   Dec. 23, 2004

(51) Int. Cl.
G06F 13/42 (2006.01)
G06F 13/00 (2006.01)
G06F 3/06 (2006.01)
G06F 12/00 (2006.01)
H04L 7/00 (2006.01)

(52) U.S. Cl. .............................. 710/29; 710/5; 710/36; 711/100; 711/105; 711/154; 711/167; 713/400; 713/401

(58) Field of Classification Search ................... 710/5, 710/52, 29, 36; 711/100, 154, 105, 167; 713/400, 401
See application file for complete search history.

(56) References Cited

U.S. PATENT DOCUMENTS

| | | | | |
|---|---|---|---|---|
| 6,445,642 B2 * | 9/2002 | Murakami | ................... | 365/233 |
| 6,498,766 B2 * | 12/2002 | Lee et al. | ................... | 365/233 |
| 6,657,634 B1 * | 12/2003 | Sinclair et al. | ............. | 345/534 |
| 6,763,416 B1 * | 7/2004 | LaBerge | ..................... | 710/305 |
| 6,820,181 B2 * | 11/2004 | Jeddeloh et al. | ............ | 711/169 |

* cited by examiner

*Primary Examiner*—Tanh Q Nguyen
(74) *Attorney, Agent, or Firm*—McAndrews Held & Malloy Ltd.

(57) ABSTRACT

Presented herein is a scheme for reducing the likelihood of erroneous DQS signals. Logic is incorporated proximate to a memory controller and receives a signal indicating a read request and a DQS signal from a memory module. The logic transmits a signal indicating the presence of data, based on the timing relationship between the DQS signals and signal indicating read requests.

12 Claims, 3 Drawing Sheets

_(US 7,299,306 B2)_

DUAL NUMERICALLY CONTROLLED DELAY LOGIC FOR DQS GATING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

A memory controller controls access to and from one or more memory module(s), such as dynamic random access memory (DRAM), SDRAM and DDR-SDRAM. A sequencer core within the memory controller issues commands to either control, read or write to the memory module. In the case of a write transaction, the sequencer core issues a command to write data at a particular address. The command to write, the data, and the address are transmitted to the memory module, and the memory module writes the data to the address.

In the case of a read transaction, the sequencer core issues a command to read data at a particular address in the memory module. When the memory module is DDR-SDRAM, unlike the case of a write transaction, after sending the command to read an address, the memory controller requires a response from the memory module. The response includes the data stored at the address.

The response from the memory module can require a variable amount of time. When the memory module responds to a read request, the memory module transmits the data at the address, with a data strobe signal (DQS). The DQS indicates to the receiving memory controller that the data is transmitted. In response to receiving the DQS signal, the memory controller reads the incoming data and stores the data into a read data queue by registering data on the rising and falling edges of DQS.

The DQS is typically a voltage pulse with a predetermined voltage and width. The memory controller detects the DQS by comparing a signal to a predetermined threshold. The threshold is usually a proportion of the voltage. When the signal exceeds the threshold, the memory controller detects the rising edge of DQS and when the signal falls below the threshold, falling edge of DQS is detected.

The memory controller and the memory module are typically implemented as separate integrated circuits. The integrated circuits are fused to a motherboard and conduct read and write transactions over a printed circuit, connecting the memory module and the memory controller.

Printed circuits are susceptible to noise signals. Noise signals can be caused by a number of different factors, such as cross-talk, simultaneous switching noise and ground bounce. If the magnitude of the noise signals exceed the predetermined voltage, the memory controller might erroneously detect a transition on DQS and read erroneous signals as data.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein is a system, method, and apparatus for Dual Numerically Controlled Delay Logic for DQS Gating. In one embodiment, there is a requesting node for transmitting a request to a responding node. The responding node provides a response, as well as a signal indicating the response is ready. The signal indicating the response is ready is received by logic. The logic transmits another signal to the requesting node indicating that the response is ready, based on the request and the response ready signal.

In another embodiment, there is presented a circuit for transferring data. The circuit includes a memory controller for issuing a read command to read the data, a memory module for storing the data and logic for transmitting a signal to the memory controller causing the memory controller to receive the data. The logic receives a signal from the memory module indicating the presence of the data, and a signal from the memory controller indicating the presence of the read command.

In another embodiment, there is presented a method for responding to a request, by transmitting the request and a signal indicating the request, transmitting a response and a signal indicating the transmission of the response, and transmitting another signal indicating the transmission of the response, based on the timing relationship between the signal indicating the request and the signal indicating transmission of the response.

In another embodiment, there is presented a method for transferring data by requesting to read the data and transmitting a signal indicating the request to read the data, transmitting the data and a signal indicating the transmission of the data, transmitting another signal indicating the transmission of the data, based on the timing relationship between the signal indicating the transmission of the data and the signal indicating the request to read the data, and reading the data after transmitting the another signal.

In another embodiment, there is presented a circuit for transferring data. The circuit includes a memory controller operable to transmit a read request, a memory module, operable to transmit data and a signal indicating transmission of the data, logic connected to the memory controller, and operable to transmit another signal to the memory controller indicating the transmission of the data, and printed circuits connecting each of the foregoing.

These and other advantages and novel features of the present invention, as well as details of illustrated embodiments thereof, will be more fully understood from the following description and drawings.

DETAILED DESCRIPTION

Figure 1:
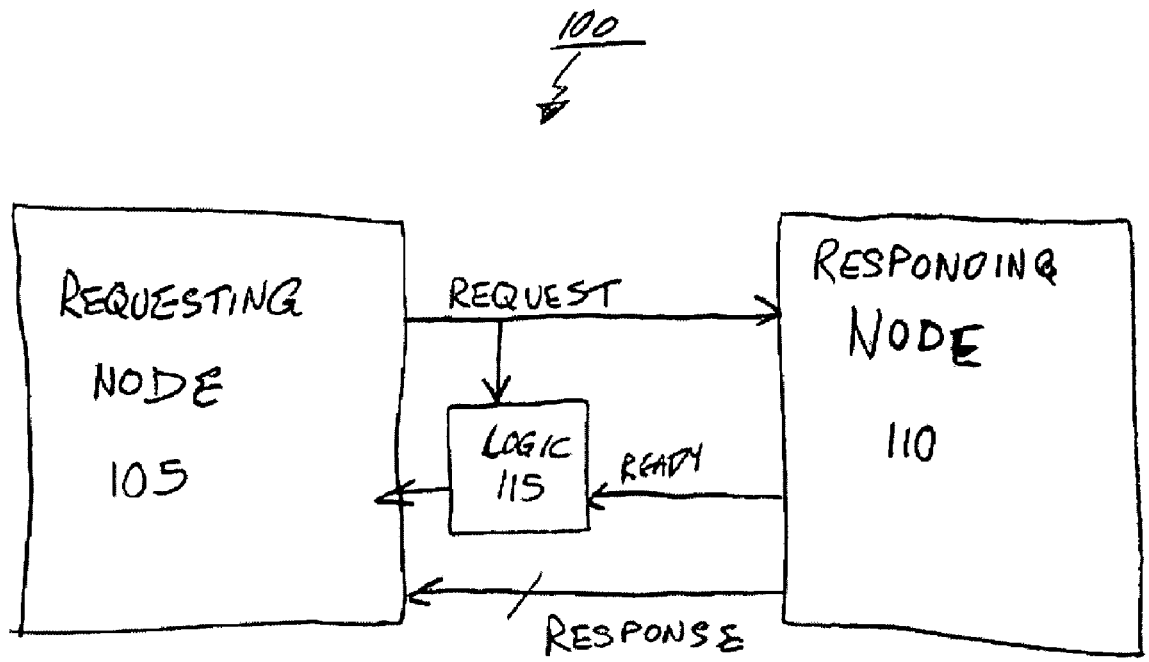
FIG. 1 is a block diagram of nodes in accordance with an embodiment of the present invention.

Referring now to FIG. 1, there is illustrated a block diagram of a requesting node 105 and a responding node 110, configured in accordance with an embodiment of the present invention. The requesting node 105 requests a transaction from the responding node 110. The requesting node 105 can comprise a wide variety of devices, including, for example, a controller, a master circuit, or a client. The responding node 110 comprises, for example, a memory module, a slave circuit, a database, or a server. The transaction can comprise, for example, a memory read, a database query, or a function.

After receiving the request, the responding node 110 can perform any number of operations to generate a response. The response can comprise, for example, the contents of the particular memory location(s), database hits, or a return value for a function. After the responding node 110 generates the response, the responding node 110 transmits the response to the requesting node 105. The responding node 110 also transmits a ready signal indicating that the response is ready to be received.

The response does not necessarily follow the request immediately. The time between the request and the response can be affected by several factors, including the time for the request and the time for response to propagate. Accordingly, the requesting node 110 utilizes a signal indicating the presence of the response. Therefore, the responding node 110 also transmits a response ready signal indicating that the response is ready.

However, the requesting node 105 and the responding node 110 are separated by a communication medium. The communication medium may be susceptible to noise signals. If the magnitude of the noise signals exceeds a certain degree, the requesting node 105 may erroneously detect the response ready signal. Erroneous detection of the response ready signal causes the requesting node 105 to receive an erroneous response.

The likelihood of erroneous detection of the ready signal can be significantly reduced by logic 115, which is proximate to the requesting node 105 or incorporated therein, that signals the requesting node 105 when the response is ready. It is noted that the response is generated as a result of the request. Accordingly, a legitimate response ready signal will occur within substantially the same period of time as the delayed request. Therefore the logic receives the response ready signal and the request signal. If the response ready signal and the delayed request signal are within substantially the same period of time, the logic will transmit another signal to the requesting node 105 indicating that the response is ready.

The period of time during which the request and the response ready signal arrive in order for the logic to transmit the another signal, can be predetermined or programmable based on response times that are empirically measured.

Figure 2:
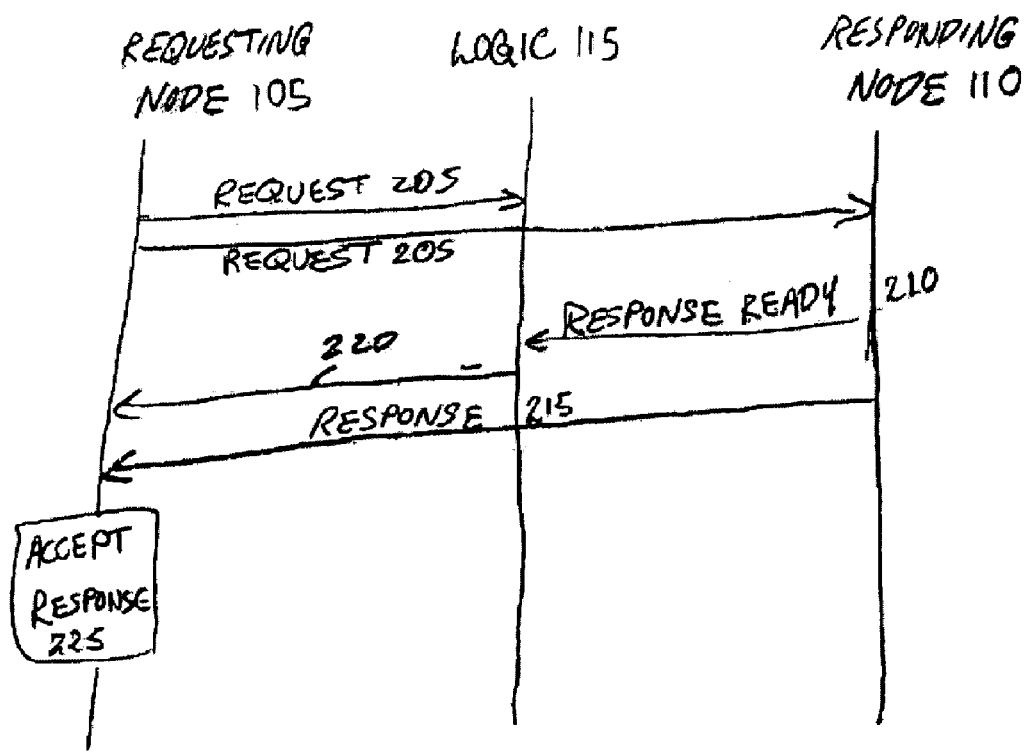
FIG. 2 is a signal flow diagram describing the operation of the nodes in accordance with an embodiment of the present invention.

Referring now to FIG. 2, there is illustrated a signal flow diagram describing the operation of the nodes in accordance with an embodiment of the present invention. The requesting node 105 transmits a request 205 to the responding node 110. The request 205 is also received at logic 115. Responsive thereto, the responding node 110 generates a response. The responding node 110 transmits a response ready signal 210 indicating that the response is ready, and the response 215.

The response ready signal 210 is also received at the logic 115. In the case where the response ready signal 210 and the delayed request 205 are received within substantially the same period of time, the logic transmits another signal 220 to the requesting node 205, indicating that the response 215 is ready. Upon receiving the signal 220, the requesting node 105 accepts the response (action 225).

In an exemplary embodiment, the foregoing can be incorporated into a DDR-SDRAM memory reading system. A memory controller and a memory module are typically implemented as separate integrated circuits. The integrated circuits are fused to a motherboard and conduct read and write transactions over a printed circuit, connecting the memory module and the memory controller.

Printed circuits are susceptible to noise signals. Noise signals can be caused by a number of different factors, such as cross-talk, simultaneous switching noise and ground bounce. If the magnitude of the noise signals exceed the predetermined voltage, the memory controller might erroneously detect a response ready signal and read erroneous signals as data.

Figure 3:
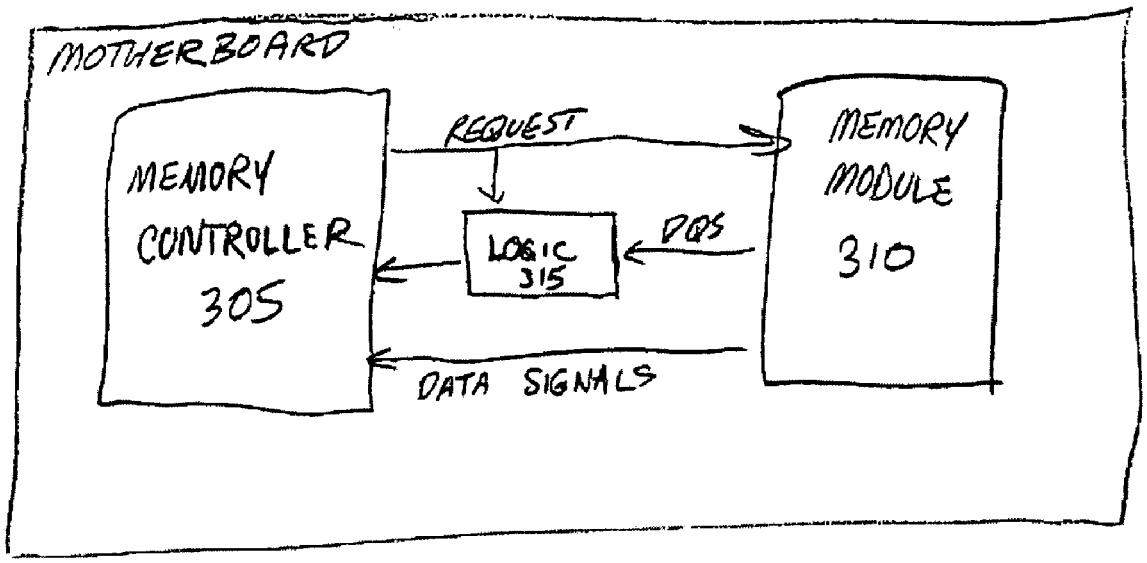
FIG. 3 is a block diagram of a circuit in accordance with an embodiment of the present invention.

Referring now to FIG. 3, there is illustrated a block diagram describing a circuit 300 for transferring data in accordance with an embodiment of the present invention. The circuit 300 includes a memory controller 305 and a DDR-SDRAM memory module 310. The memory controller 305 controls access to and from the memory module 310.

In the case of a read transaction, the memory controller 305 transmits a request to read data at a particular address in the memory module 310. The response from the memory module can require a variable amount of time. When the memory module 310 responds to a read request, the memory module transmits the data at the address, with a data strobe signal (DQS). The DQS indicates that the data is transmitted. The DQS signal toggles with each packet of data transmitted by the DDR-SDRAM.

The requesting node 305 and the responding node 310 are affixed to a motherboard 312 comprising any number of printed circuits. The requesting node 305 and the responding node 310 communicate the foregoing signals via several of the printed circuits. As noted above, printed circuits are susceptible to noise signals from a variety of sources. If the magnitude of the noise signals exceeds a certain degree, the printed circuit may simulate an erroneous DQS signal. If the DQS signal is received directly by the memory controller 305, the memory controller 305 may erroneously detect a DQS signal and read erroneous data.

To significantly reduce this possibility, logic 315 receives the DQS signal. It is noted that the DQS signal is transmitted as a result of the request for a read transaction. Accordingly, a legitimate DQS signal will occur within substantially the same period of time as the read request. Therefore the logic receives the read request and the DQS signal. If the DQS signal and the delayed read request signal are within substantially the same period of time, the logic will transmit another signal to the memory controller 305 indicating that the data is ready.

Figure 4:
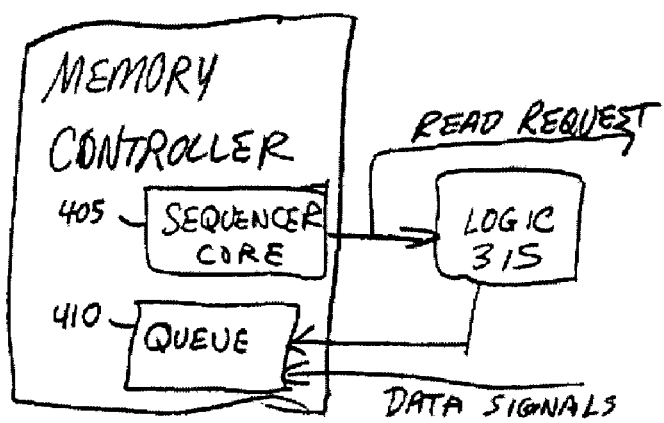
FIG. 4 is a block diagram of a memory controller configured in accordance with an embodiment of the present invention.

Referring now to FIG. 4, there is illustrated a block diagram describing the memory controller 305 configured in accordance with an embodiment of the present invention. The memory controller 305 comprises a sequencer core 405 and a queue 410. During a read transaction, the sequencer core 405 transmits the read request to the logic 315 and the memory module 310. The queue 410 receives the output of the logic 315 and the data signals. The queue 410 registers the data signals on the rising and falling edges of the output of logic 315.

Figure 5:
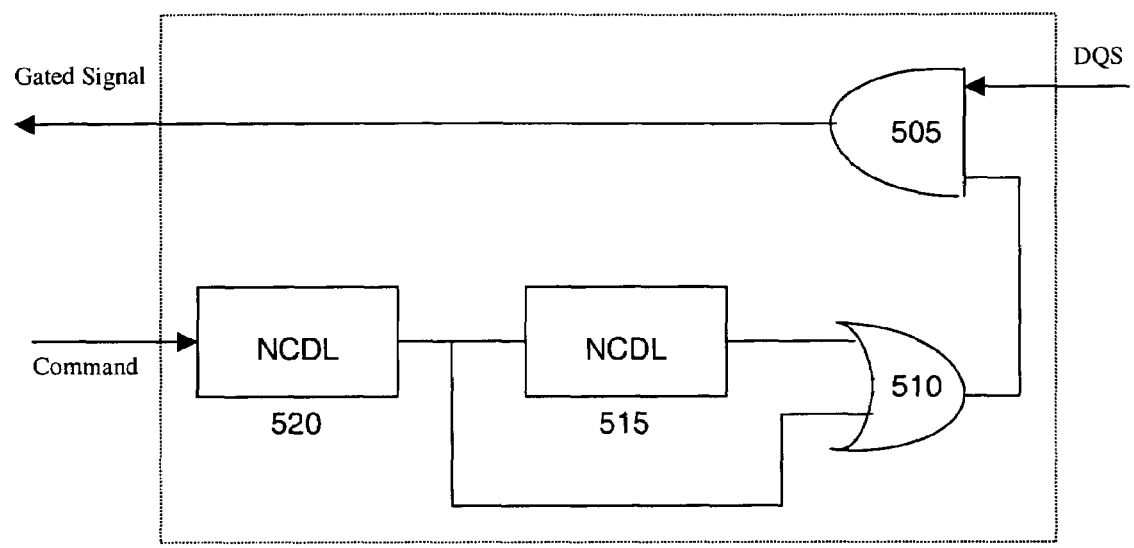
FIG. 5 is a block diagram of logic configured in accordance with an embodiment of the present invention.

Referring now to FIG. 5, there is illustrated a block diagram of the logic 315. The logic 315 receives the DQS signal from the memory module 310. Due to the presence of noise signals, the logic 315 prevents detection of erroneous DQS signals at the memory controller 305. As noted, the DQS signal is transmitted in response to the read request transaction. Accordingly, a legitimate DQS signal is transmitted between a first and second time following transmission of the read request. The first time is the shortest possible response time to a read request, such as one clock cycle. The second time is the longest possible response time to a read request. Therefore, the logic 315 distinguishes legitimate DQS signals from erroneous DQS signals by examining the timing relationship of the DQS signal with a read request.

If the DQS signal is received between the first and second times after a read request, the DQS signal is legitimate and the logic 315 transmits another signal to the memory controller 305. The signal transmitted by the logic 315 causes the memory controller 305 to read the data signals. If the DQS signal is not received between the first and second times after a read request, the DQS signal is erroneous and the logic 315 does not transmit a signal to the memory controller 305.

The logic 315 includes an AND gate 505, an OR gate 510, a first numerically controlled delay logic (NCDL) 520, and a second NCDL 515. The logic receives the DQS signal at the AND gate 505. The output of the logic 315 is the output of the AND gate 505. The output of the AND gate 505 is a "0", except between the first time and the second time following a read request. Between the first time and the second time following the read request, the output of the AND gate is the logical value of the DQS signal. However, outside of the first time and the second time, the output of the AND gate remains "0", regardless of the logical value of the DQS signal. In the foregoing manner, the logic 315 prevents erroneous detection of DQS signals by the memory controller 305. As the difference between the first time and the second time can be wider than the read request signal width, the logic 315 uses two NCDLs to individually control the rising and falling edges of the signal that gates the DQS signal.

Another input to the AND gate 505 is connected to the output of the OR gate 510. The output of the OR gate 510 is set between the first time and the second time following a read request. The first NCDL 520 receives the read request and delays the read request until the first time. At the first time, the first NCDL 520 propagates the read request signal to the OR gate 510. When the OR gate 510 receives the propagated read request signal from the first NCDL 520, the OR gate 510 outputs a logical "1". The output of the first NCDL 520 is also input to the second NCDL 515. The second NCDL 515 delays the output of the first NCDL 520 until the second time. At the second time, the second NCDL 515 propagates the falling edge output of the first NCDL 520 to the OR gate 510. Responsive thereto, the OR gate 510 generates a "0" output.

Figure 6:
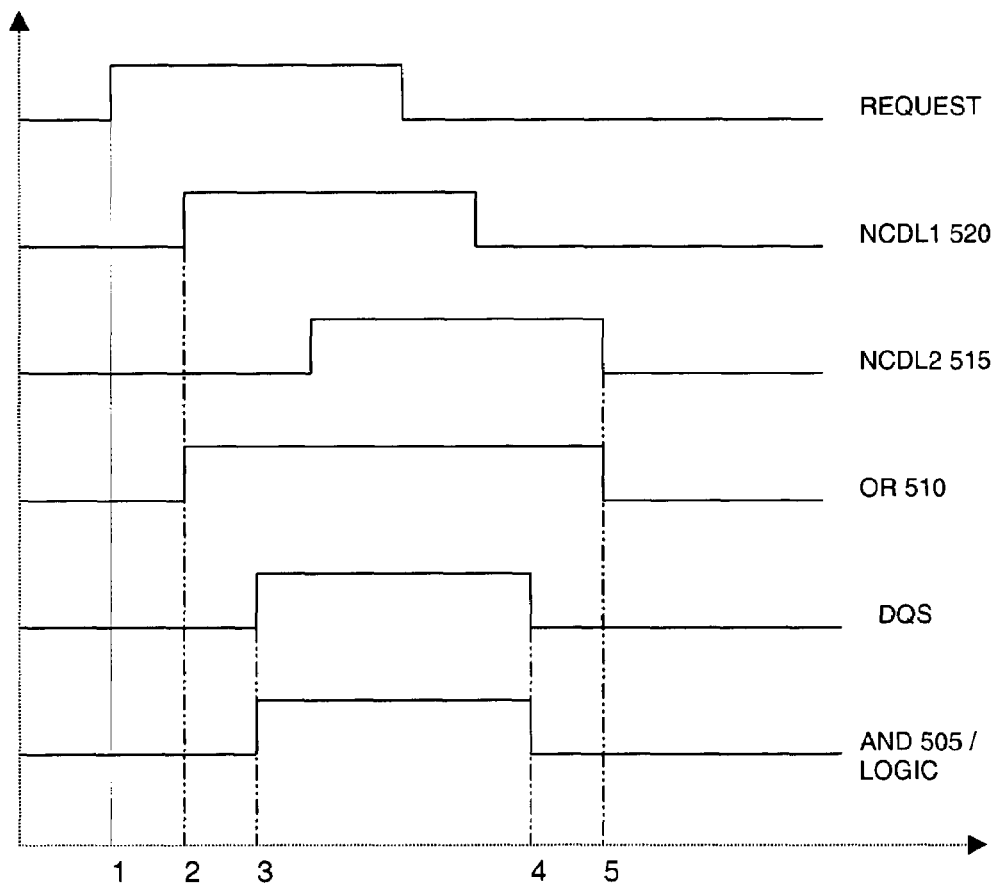
FIG. 6 is a timing diagram describing one operation of the logic.

Referring now to FIG. 6, there is illustrated a timing diagram describing operations of the logic 315. At time, t=1, the memory controller 305 transmits a read request to the memory module 310. The read request is also received at the first NCDL 520. The first NCDL 520 delays the signal until the first time after the read request, t=2. At t=2, the first NCDL 520 propagates the rising edge of the signal to the OR gate 510, causing the OR gate 510 to generate a logical "1" output. The logical "1" is received by the AND gate 505. Upon receiving the logical "1" from the OR gate 510, the output of the AND gate 505 is equivalent to the DQS signal. At t=3, the DQS signal transmitted by the memory module is received by the AND gate 505. Responsive thereto, the AND gate 505 transmits a logical "1" signal. The output of the AND gate 505 is the output of the logic 315 that is provided to the memory controller 305, and indicates that the data is ready to be received.

While the invention has been described with reference to certain embodiments, it will be understood by those skilled in the art that various changes may be made and equivalents may be substituted without departing from the scope of the invention. In addition, many modifications may be made to adapt particular situation or material to the teachings of the invention without departing from its scope. Therefore, it is intended that the invention not be limited to the particular embodiment(s) disclosed, but that the invention will include all embodiments falling within the scope of the appended claims.

The invention claimed is:

1. A system for responding to requests, said system comprising:
   a requesting node for transmitting a request;
   a responding node for transmitting a response to the request; and
   a logic for transmitting a signal to the requesting node indicating the presence of the response, said logic receiving a signal from the responding node indicating the presence of data and a signal from the requesting node indicating the presence of the request, wherein the logic further comprises:
   an AND gate for transmitting the signal to the requesting node after a time interval, wherein during the time interval, the AND gate receives the signal from the requesting node and the signal from the responding node.

2. A circuit for transferring data, said circuit comprising:
   a memory controller for issuing a read command to read the data;
   a memory module for storing the data; and
   a logic for transmitting a signal to the memory controller causing the memory controller to receive the data, said logic receiving a signal from the memory module indicating the presence of the data and a signal from the memory controller indicating the presence of the read command, wherein the logic further comprises:
   an AND gate for transmitting the signal to the memory controller after a time interval, wherein during the time interval, the AND gate receives the signal from the memory controller and the signal from the memory module.

3. The circuit of claim 2, wherein the memory controller further comprises:
   a sequencer core for issuing the read command; and
   a queue for receiving the data.

4. The circuit of claim 2, wherein the logic further comprises:
   a numerically controlled delay logic for receiving the read command, and for transmitting the signal indicating the presence of the read command after a first predetermined period of time after receiving the read command.

5. The circuit of claim 2, wherein the logic further comprises:
   a numerically controlled delay logic for receiving the read command, and for transmitting a first signal after a first predetermined period of time after receiving the read command and transmitting a second signal after a second predetermined period of time after receiving the read command; and an OR gate for transmitting the signal indicating the presence of a read transaction, wherein the OR gate further comprises:

a first input for receiving the first signal; and a second input for receiving the second signal.

6. The circuit of claim 5, wherein the memory module transmits the signal indicating the presence of the data between transmission of the first signal and transmission of the second signal.

7. The circuit of claim 5, wherein the memory module transmits the signal indicating the presence of the data between transmission of the rising edge of the first signal and the transmission of the falling edge of the second signal.

8. The circuit of claim 2, wherein the memory module is a DDR-SDRAM.

9. A circuit for transferring data from memory, said circuit comprising:

a memory controller, wherein the memory controller is operable to transmit a read request;

a memory module, wherein the memory module is operable to transmit data and a signal indicating transmission of the data from the memory module;

a logic connected to the memory controller, wherein the logic is operable to transmit another signal to the memory controller indicating the transmission of the data from the memory module, wherein the logic further comprises:

an AND gate connected to the memory controller, said AND gate operable to transmit the another signal to the memory controller after a time interval, wherein during the time interval, the AND gate receives a signal from the memory controller and the signal indicating transmission of the data from the memory module; and a printed circuit board connected to the memory controller, the memory module, and the logic, wherein the printed circuit board is connected to transmit the read request to the memory module, and the printed circuit board is connected to transmit the signal indicating transmission of the data from the memory module to the logic.

10. The circuit of claim 9, wherein the logic further comprises:

a first numerically controlled delay logic;

a second numerically controlled delay logic connected to the first numerically controlled delay logic; and an OR gate connected to the first numerically controlled delay logic and the second numerically controlled delay logic, and the OR gate is connected to the AND gate.

11. The circuit of claim 10, wherein the first numerically controlled delay logic controls a rising edge of a gating signal and wherein the second numerically controlled delay logic controls the falling edge of the gating signal.

12. The circuit of claim 9, wherein the memory controller further comprises:

a sequencer core connected to the logic and the printed circuit board; and a queue connected to the logic to receive the another signal indicating the transmission of the data from the memory module.

* * * * *